United States Patent [19]

Johnson

[11] Patent Number: 4,856,347

[45] Date of Patent: Aug. 15, 1989

[54] METHOD AND APPARATUS FOR MEASURING THE FLOW RATE AND VELOCITY OF A LIQUID IN A PIPELINE

[76] Inventor: Hans K. Johnson, P.O. Box 254, 7501 Stjordal, Norway

[21] Appl. No.: 77,386

[22] Filed: Jul. 24, 1987

[51] Int. Cl.$^4$ ................................................ G01F 1/28
[52] U.S. Cl. ................................. 73/861.72; 73/434
[58] Field of Search .......................... 73/861.72, 434

[56] References Cited

U.S. PATENT DOCUMENTS

| | | | |
|---|---|---|---|
| 2,897,672 | 8/1959 | Glasbrenner et al. | 73/861.72 |
| 3,049,919 | 8/1962 | Roth | 73/861.72 |
| 3,293,913 | 12/1966 | Hannon | 73/861.72 |
| 3,584,508 | 6/1971 | Shiba | 73/861.72 |

FOREIGN PATENT DOCUMENTS 157135 12/1956 Sweden ........................... 73/861.72

*Primary Examiner*—Herbert Goldstein
*Attorney, Agent, or Firm*—James E. Pittenger

[57] ABSTRACT

A flow meter for determining the flow rate of a liquid or slurry flowing in a pipeline or similar conduit. The flow meter is capable of metering the flow of a multiple-phase medium such as a gas-oil combination from a sub sea oil well. The meter includes a tube-like J-bend member which is connected to the pipeline by a non-restricting, ring-type universal joint. The J-bend member is usually arranged with the member arranged in a horizontal plane with the member supported or suspended by a pair of load cells which are arranged 90° apart and measure the reaction forces in a vertical and horizontal plane passing through the center of gravity. In this way, the load cells measure the weight of the J-bend member as well as the reaction moment produced by the liquid flow. In another embodiment the J-bend member is supported by a pair of rollers positoned 90° to each other and arranged to suspend the J-bend member.

7 Claims, 1 Drawing Sheet

U.S. Patent  Aug. 15, 1989  4,856,347
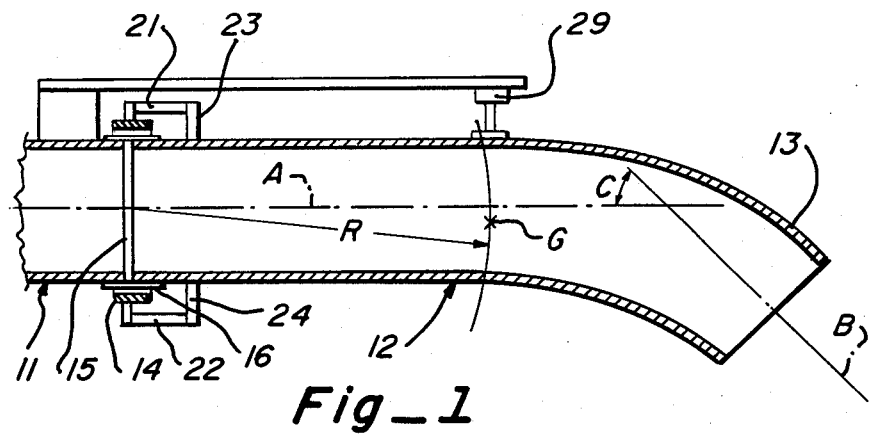
Fig_1
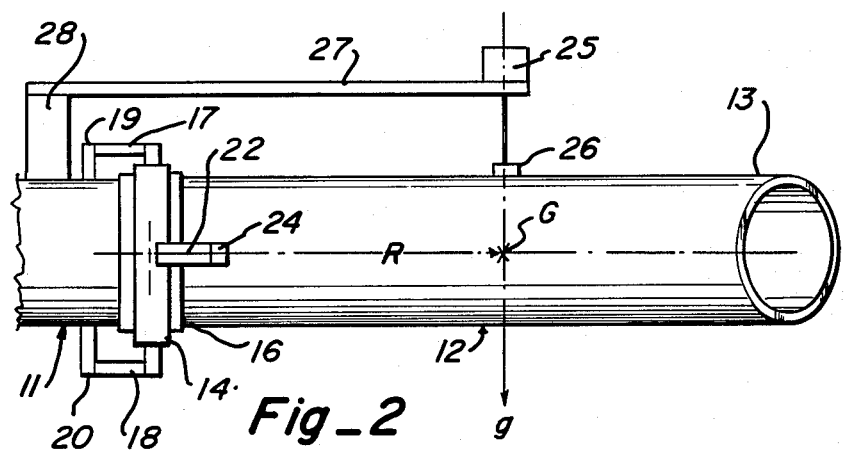
Fig_2
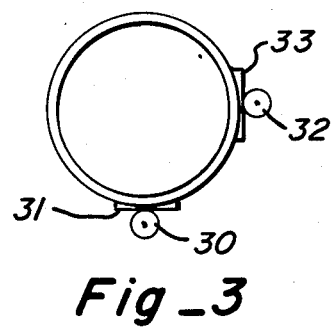
Fig_3

METHOD AND APPARATUS FOR MEASURING THE FLOW RATE AND VELOCITY OF A LIQUID IN A PIPELINE

This invention relates to a method and an apparatus for determining the flow rate and velocity of a liquid or a slurry flowing in a pipeline or a similar conduit, particularly for metering the flow of a multiple phase medium, such as a gas-oil flow from a sub sea oil well.

Heretofore, the determining of such flows has presented difficulties. Several flow meters have been proposed, but none have been readily available for the precise determination of the flow of a slurry and of bi- or multiple phase flow containing a liquid and a gas.

In EPO-Application No. 0 171.937 an flow meter is described wherein a S-shaped flow tube is located within a housing with an inlet and an outlet which are in register with the tube ends. With this device, the metering of a medium containing gas will be inaccurate.

In German Pat. No. 1.648.115 a flow meter is described, in which a J-bend is suspended between an inlet tube and an outlet tube and with a load cell for metering the momentum set up by the flow. This device is however suitable for measurements only with a full flow, leaving open the measurement of lower outputs.

It is therefore an object of the present invention to provide a specific measuring system suitable for determining the flow rate and the velocity of a compound flow, particularly of a slurry or a multiple phase flow.

It is also an object to provide a flow meter which can measure a limited flow, substantially less than the maximum capacity of the meter.

It is a further object to provide a flow metering system which is simple, has a low liability for failure and is easy and inexpensive to maintain.

Finally it is an object of the present invention to provide a flow meter which is particularly suitable for metering the return flow of drilling mud from an oil well being drilled. Included is a return flow covering only a small fraction of an outlet tube.

According to the invention, an advantageous flow meter can be provided according to the features described herein.

A flow meter according to the invention has proved superior for metering bi-phase flow from a sub sea oil well, including a slurry containing solids and gases in a liquid. The novel flow meter will work reliable over long periods of time, comprising elements which are simple to manufacture or easily available.

The invention will now be described in connection with the accompanying drawings wherein:

FIG. 1 schematically illustrates an elevational view in cross section of the main structural elements of a flow meter according to the invention, FIG. 2 illustrates a side view of the flow meter in FIG. 1 in no-flow condition, and FIG. 3 is a cross-sectional view showing another embodiment of the flow meter.

In the drawings, only the structural parts are shown. Electrical connections and the circuits for processing the measuring signals from the load cells are omitted, as these parts and their arrangement can be of known kind.

FIGS. 1 and 2 show an embodiment of the invention for metering the flow of medium from a tube 11. The main structural element of the metering system is a J-bend 12, the suspension of which to the tube 11 will be described more detailed below. The J-bend 12 is curvilinear in a plane which in no-flow condition is substantially horizontal. The angle between the main axis A, i.e. that of the inlet end of the J-bend 12, and the axis B of its outlet is between 30° 90°. This angle C determines the range in which the flow meter can be used, in regard to flow rates and weights of flow.

The upstream part of the J-bend 12 is a straight extension of the tube 11, while the bend is provided at the outer end 13. In an alternative embodiment, the straight part can be reduced or shortened.

The tube 11 is connected to the J-bend 12 by a connecting ring 14 encircling the joint 15 between said two parts. The joint 15 is covered by a sealing sleeve 16 of an elastic and flexible material. This sleeve 16 should constraint the movement of the J-bend as little as possible.

The connecting ring 14 is suspended in an upper and a lower spring blade 17 and 18 respectively, joined at diametrically opposite points by brackets 19 and 20 at the circumference of the tube 11. The blades 17 and 18 are arranged in a common vertical plane, with a minimum resistance toward sideward bending.

The J-bend 12 is attached to the ring 14 by a similar set of two spring blades 21 and 22 arranged at opposite sides of the tube 11, as seen in FIG. 1, held by two brackets 23 and 24 respectively. The spring blades 21 and 22 are arranged in a common plane being substantially horizontal. Thus, this part of the connecting arrangement will add a minimum resistance to sideward bending. Any flow placing a momentum at the J-bend will thus create a sideward deflection of the blades 17 and 18 and the weight of the flow will correspondingly deflect the blades 21 and 22.

The J-bend 12 is further suspended in a load cell 25 connected between a bracket 26 on the upper side of the J-bend 12 a distance R from the joint 15 and an arm 27 protruding above the J-bend from a carrier or bracket 28 on the tube 11. In no-flow condition as shown in FIG. 2, the bracket 26 is arranged vertically above the center of gravity G of the J-bend 12.

Finally, the sideward momentum on the J-bend 12 is metered by a load cell 29 arranged on the convex side of the J-bend 12 in the vertical cross plane through the cell 25. To be precisely, the load cells 25 and 29 should be arranged in a common plane passing through the pivot point defined by the connection ring 14.

The load cells 25 and 29 are connected to a measuring equipment of known kind (not shown) to meter the weight and the momentum on the J-bend 12, respectively.

To avoid overload on the load cells 25 and 29, both suspensions may be provided with stops which will limit the maximum load placed on the respective cells.

To calibrate this flow meter, mediums with different, known gravities and flow rates are pumped through the tube 11.

The momentuum created by a flow through the J-bend 12 will be a function of the specific weight of the medium, its velocity and its part of the total bend area. Correspondingly, the weight of the flow will be a known function of the specific weight of the flow medium and the fraction of the bend area filled by the flow. Any bubbles or other gas voids in the flow will not disturb the metering. If the specific weight of the slurry varies strongly, it may be necessary to meter the flow level, e.g. by using an ultra sound device, or by determining the specific weight of the slurry at the outlet of the J-bend 12.

In FIG. 3 is shown a further embodiment of the attachment of the measuring equipment. The weight of the J-bend 12 is transferred to a load cell (not shown) arranged under the bend by means of a roller wheel 30 rolling on a downward faced race 31. Correspondingly the momentum is transferred to load cell by a roller wheel 32 rolling on a vertical race 33 on the outer side of the J-bend 12.

What is claimed is:

1. A flow meter for determining the flow rate and the specific gravity of a flowing liquid having a gaseous and a solid constituent, said flow meter comprising a J-bend member suspended between at least a pair of load cells and including a connecting member joining the J-bend with an inlet tube, said load cells being provided with means to suspend the J-bend in a substantially vertical and a substantially horizontal plane respectively, and said pair of load cells are mounted on a rigid surface and arranged generally in a common plane transversal to the axis of the J-bend to measure the weight and the momentum respectively, substantially at the center of gravity of the J-bend.

2. A flow meter for determining the flow rate and the velocity of a liquid or slurry mass, the pipeline having a tube-like J-bend member for passage of the liquid medium to be metered, said tube-like J-bend member being suspended by at least two load cells to measure the mechanical forces of the mass flowing through the pipeline in order to determine the weight and movement of the member, characterized by arranging one load cell in conjunction with the J-bend in a vertical plane which passes through the center of gravity of the J-bend, and attaching a second load cell in a transverse plane coinciding with the center of gravity to determine the horizontal reaction forces in the J-bend due to the mass flow, and said J-bend is connected to an inlet pipe by a non-restrictive universal joint.

3. A flow meter according to claim 2, characterized in that the angle between the two legs of the J-bend lies between 30° and 90°.

4. A flow meter according to claim 2, characterized in that the universal joint comprises a sealing ring arranged concentrically around the joint between the inlet pipe and the J-bend, said ring being attached to brackets arranged at right angles to the inlet pipe and J-bend.

5. A flow meter according to claim 4, characterized by a sealing ring which consists of a sealing sleeve and a concentric rigid ring which provides a minimum of resistance to the pivoting of the J-bend.

6. A flow meter according to claim 2, characterized in that one of the load cells is connected to a roller engaging a flat horizontal surface mounted under and supporting the J-bend.

7. A flow meter according to claim 2, characterized in that the load cells are positioned so as to have an equal radius with respect to the pivot point of the joint between the inlet pipe and the J-bend.

* * * * *